(12) United States Patent
Irwin et al.

(10) Patent No.: US 9,080,694 B2
(45) Date of Patent: Jul. 14, 2015

(54) BULKHEAD FITTING ASSEMBLY

(75) Inventors: James P. Irwin, Renton, WA (US); David W. Minteer, Lake Tapps, WA (US); Benjamin A. Johnson, Lynnwood, WA (US); Erik W. Dowell, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 479 days.

(21) Appl. No.: 13/166,371

(22) Filed: Jun. 22, 2011

(65) Prior Publication Data

US 2012/0326431 A1    Dec. 27, 2012

(51) Int. Cl.
| | |
|---|---|
| *F16L 11/127* | (2006.01) |
| *F16L 5/06* | (2006.01) |
| *F16L 5/08* | (2006.01) |
| *F16L 5/12* | (2006.01) |
| *B64C 1/10* | (2006.01) |

(52) U.S. Cl.
CPC ... *F16L 5/06* (2013.01); *F16L 5/08* (2013.01); *F16L 5/12* (2013.01); *B64C 1/10* (2013.01); *Y10T 29/49826* (2013.01)

(58) Field of Classification Search
USPC ............ 285/47, 89, 108, 285.1, 286.1, 291.1, 285/331, 46, 56, 907, 923; 4/252.4, 252.5, 4/DIG. 7
See application file for complete search history.

(56) References Cited

U.S. PATENT DOCUMENTS

| | | | | |
|---|---|---|---|---|
| 1,505,279 | A | * | 8/1924 | Mueller et al. .............. 285/46 X |
| 2,427,431 | A | * | 9/1947 | Wieland ..................... 4/252.5 X |
| 5,201,549 | A | * | 4/1993 | Davey ............................. 285/39 |
| 5,433,183 | A | | 7/1995 | Vansnick |
| 5,970,960 | A | * | 10/1999 | Azuma .................... 123/568.12 |
| 6,173,701 | B1 | * | 1/2001 | Azuma .................... 123/568.17 |
| 2008/0116319 | A1 | | 5/2008 | Negley et al. |

FOREIGN PATENT DOCUMENTS

| | | |
|---|---|---|
| BE | 637028 | 12/1963 |
| FR | 2706976 | 12/1994 |
| WO | 98/15765 | 4/1998 |

OTHER PUBLICATIONS

PCT, International Search Report and Written Opinion, International Application No. PCT/US2012/038836 (Aug. 31, 2012).

* cited by examiner

*Primary Examiner* — Gregory Binda
(74) *Attorney, Agent, or Firm* — Robert B. Parker

(57) ABSTRACT

A bulkhead fitting assembly may include a tube, a mounting flange, and a thermal shell joining the mounting flange and the tube; the thermal shell may consist of a thin barrier and form an air gap between the tube and the mounting flange.

8 Claims, 9 Drawing Sheets

US 9,080,694 B2

BULKHEAD FITTING ASSEMBLY

FIELD

The description generally relates to a bulkhead fitting, and more specifically, to a hydraulic bulkhead fitting assembly for use in a composite structure aircraft.

BACKGROUND

Bulkhead fittings are used as part of a system when it is necessary to pass a conduit, tube, or other similar apparatus through a fluid impermeable barrier or bulkhead. These bulkheads can be arranged to form fuel tanks, climate-controlled spaces, air containment units, which are intended to segregate either a liquid or a gas from a surrounding environment. These bulkhead fittings are furnished with redundant seals to prevent external fluid transfer or leakage through the bulkhead around the tube by means of o-rings, fay and fillet seals.

A bulkhead fitting traditionally functions by providing a robust and reliable connection to structure allowing fluid to be transmitted across the interface through a transport element tube. In hydraulic systems, the hydraulic fluid (and therefore hydraulic transfer element tube) may become heated to high temperatures. This high temperature may damage structure if there is a direct connection between the transfer element tube and the heat-sensitive structure. Heat may also deform or modify the interface between the bulkhead and conduit and compromise the sealing features of the fitting. Therefore, there have been developed means of thermally insulating the bulkhead fitting and conduit from the bulkhead, therefore preventing damage to the bulkhead.

One example of such thermal insulation is the use of a plastic insulator between the fitting and bulkhead. This barrier may be up to an inch thick on either side of the fitting, but provides sufficient insulation to prevent damage to the bulkhead. Another example is the use of a wide thermally conductive surface to dissipate the heat without creating a localized area of high temperature.

With the use of composite materials for aircraft, it may be necessary to utilize the hydraulic conduits as a means for transferring electrical energy due to lightning strikes or precipitation static. Because thermal insulating materials tend to also insulate against electricity, this method tends to not allow for a combined solution of thermal non-conductivity (to resist the flow of heat) with electrical conductivity (to pass the flow of electrical current from fitting to bulkhead) in the properties of the insulating materials in a hydraulic bulkhead fitting. To provide for electrical conductivity while providing thermal insulation, current may be diverted away from the hydraulic line.

Further, Federal Aviation Regulation (FAR) 25.981 requires a redundant system so that any single failure combined with a latent failure cannot result in an ignition source within the fuel tank of an aircraft. There is therefore recognized a need in the art for an improved bulkhead fitting assembly that satisfies FAR 25.981.

One method of overcoming this restriction has been the use of additional components included with a bulkhead fitting installation. Installing these additional parts can add time and weight to a bulkhead fitting installation but provide for protection against spark propagation. There is therefore proposed a novel bulkhead fitting assembly to overcome these problems and others in the prior art. The proposed assembly provides a combined solution in the insulation of materials using titanium metal (or equivalent) to provide a more efficient solution than the existing methods offering savings in weight and expense to a manufacturer.

SUMMARY

The present disclosure describes a novel bulkhead fitting that consists of a tube, a mounting flange, and a thermal shell joining the mounting flange to the tube. The thermal shell consists of a thin barrier that forms an air gap between the tube and mounting flange, thereby reducing heat transfer between the tube and mounting flange. Further described is a novel method for manufacturing a bulkhead fitting assembly. The method consists of the steps of providing a tube with a perimeter shoulder and a mounting flange with a central opening and a cylindrical shell extending away from the central opening. The perimeter shoulder and cylindrical shell are welded together, thereby forming an all metal fitting. This fitting thereby has a thermal shell that includes a peripheral barrier for leakage prevention and electrical shielding.

Further described herein is a novel method of sealing an opening in a bulkhead. This method includes the steps of inserting a bushing through an opening and inserting a hydraulic fitting through the opening. The hydraulic fitting generally includes a tube for carrying a hydraulic fluid, a mounting flange, and an adapter for securing the hydraulic fitting to the bulkhead. A jamb nut is attached to the adapter, thereby sandwiching the bulkhead between the mounting flange of the fitting and the nut. The tube is connected to the mounting flange by a thin thermal shell.

According to further embodiments, the thermal shell consists of a peripheral flange extending radially away from the tube and a cylindrical shell extending axially away from the mounting flange.

According to a further embodiment, the thermal shell provides a continuous all metal path between the tube and mounting flange.

DESCRIPTION

Figure 1:
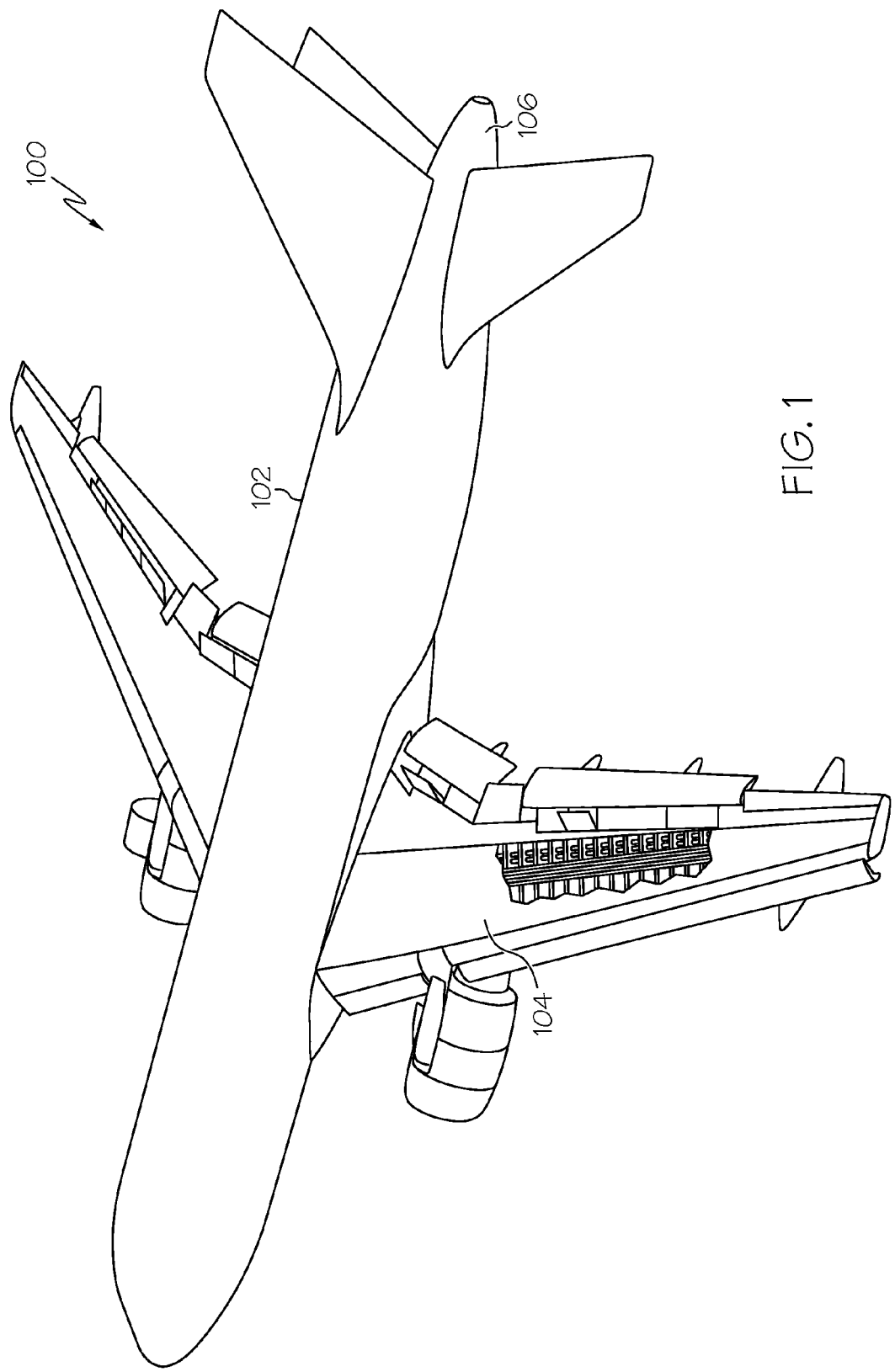
FIG. 1 is a perspective view of an aircraft according to one embodiment.
Figure 2:
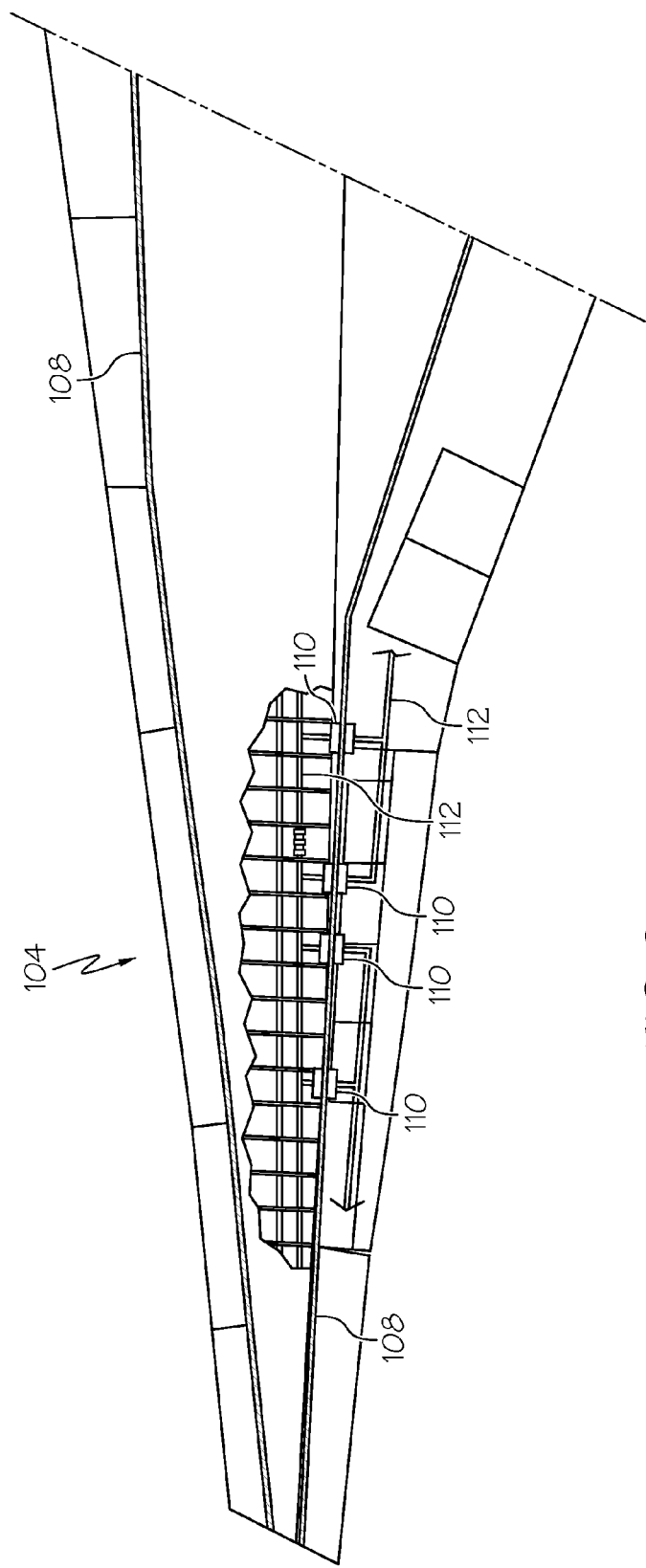
FIG. 2 is a top plan cutaway view of a wing of the aircraft shown in FIG. 1.

FIG. 1 shows an aircraft 100 according to one embodiment. The aircraft 100 generally includes a fuselage 102 wings 104 and tail 106. The wings 104 may include tanks to store fuel for the aircraft 100. Inside the wings 104, the tanks may have bulkheads 108 (FIG. 2) to isolate the fuel from the rest of the airplane. As further shown in FIG. 2, a number of hydraulic conduits 112 may pass through the bulkhead 108 with each hydraulic conduit 112 including a bulkhead fitting 110.

While the fitting 110 is generally described as utilized in concert with an aircraft 100, it is understood that the fitting 110 may be used in other non-aircraft settings, including, without limitation, industrial, space, construction, or watercraft applications. Further, the fitting 110 may be used in non-hydraulic applications, including, without limitation, electrical conduits, water conduits, or pneumatic conduits. Any other conduits, tubes, or apparatus which passes through a bulkhead 108 or other barrier may include the fitting described herein.

Figure 3A:
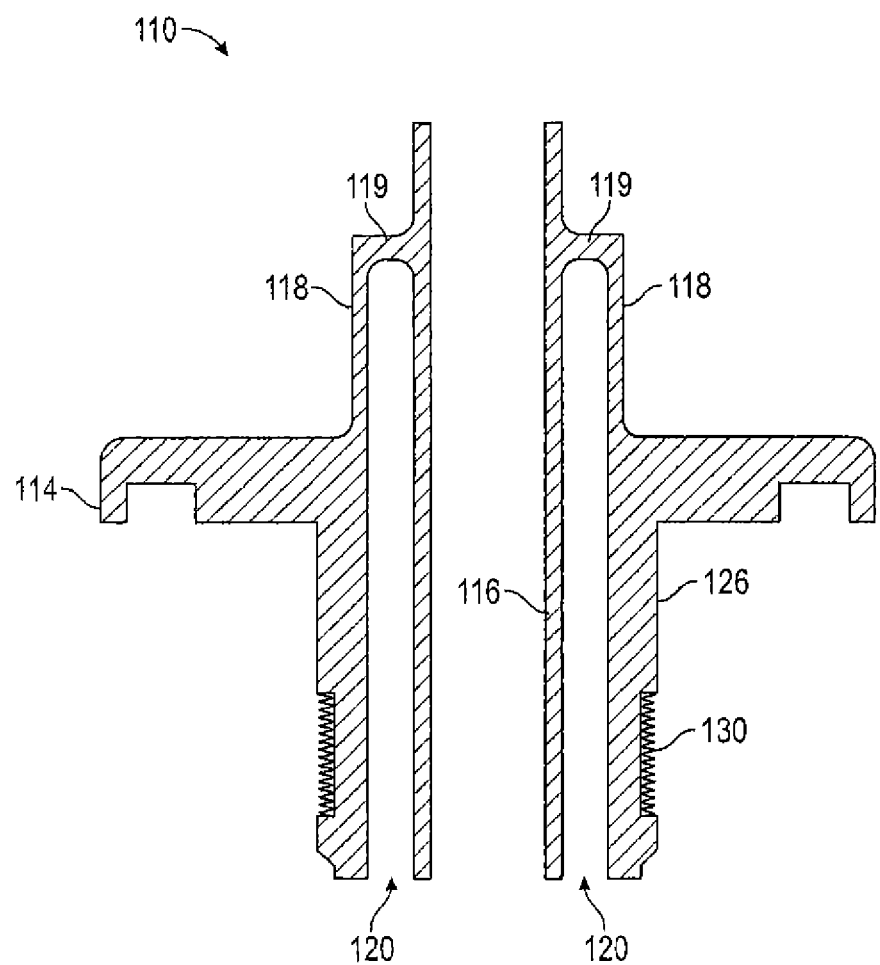
FIG. 3A is a side cutaway view of one embodiment.
Figure 3B:
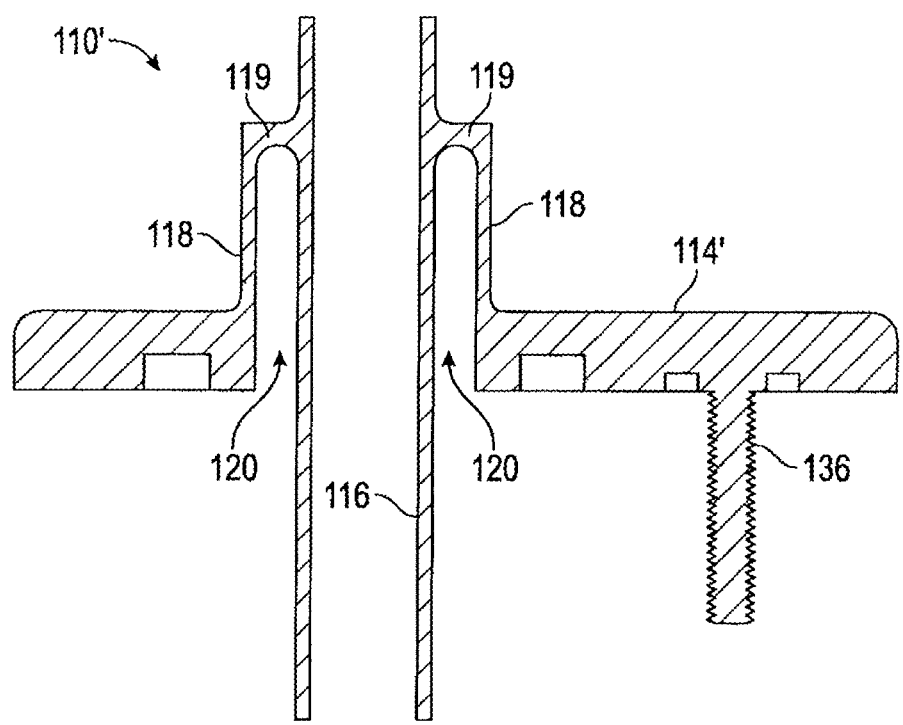
FIG. 3B is a side cutaway view of another embodiment.

FIGS. 3A-B illustrate various embodiments of the described apparatus. As shown in FIG. 3A, the bulkhead fitting assembly 110 generally consists of a mounting flange 114 attachable to the bulkhead 108 (see FIGS. 4A-B) and a tube 116 that forms part of the conduit 112 (see FIG. 2). The tube 116 is joined to the mounting flange 114 by means of a thermal shell 118 that limits heat transfer between the tube and mounting flange.

As is well known in the art, the amount of heat that can be transferred through a thermal path is dependent on the cross sectional area of the thermal path, length and thermal conductivity of the material in the path. The thermal path in the bulkhead fitting 110 through which the heat transfer is limited is the shell. By reducing the cross sectional area of the shell 118 and the thermal conductivity of the material in the shell 118, the amount of heat transferred to the bulkhead 108 is reduced. By adjusting the length of the thermal shell 118, the heat transferred through the shell 118 can be controlled to protect the bulkhead. Heat that is transferred through the thermal shell 118 to the mounting flange 114 and bulkhead 108 may be dissipated from the bulkhead 108 to the surrounding environment, further reducing the risk of exposing the bulkhead 108 to high temperatures.

Because the cross sectional area of the thermal shell 118 is reduced, the shell 118 is thin and therefore must be constructed from a material that provides high mechanical strength to enable adequate transfer of mechanical load from the tube to the mounting flange and bulkhead. To enable a continuous all metal design, allowing for electrical conductivity, the material is preferably selected to be weldable so that the shell 118 may be constructed of separate pieces and manufactured. To transfer electrical current from tube to mounting flange and bulkhead a material with reasonably high electrical conductivity must be selected. To resist heat transfer a material with relatively low thermal conductivity must be selected. One class of materials that meets all of these requirements is titanium alloy materials. When made from this material, a bulkhead fitting can be a single piece welded part. Other materials that can be considered are corrosion resistant steel alloys.

As further shown in FIG. 3A, the thermal shell 118 may be spaced away from the tube 116 to form an air pocket 120 between the tube 116 and thermal shell 118. This air pocket 120 further encourages heat transfer away from the thermal shell 118, thereby reducing the chance of the mounting flange 114 reaching a sufficient temperature to damage the bulkhead 108. This air pocket 120 is open to the space outside the tank and sealed from the inside of the tank to provide a fluid barrier. The air pocket 120 may be positioned inside the tank (thereby inverting the fitting), but is preferably outside the tank so that it does not fill up with fluid.

Connecting the tube 116 to the shell 118 is a shoulder 119. The shoulder 119 is sized to transfer the mechanical load from the tube 116 to the shell 118 without mechanical failure of tube 116 and shell 118 (for example, cracking of a weld or breaking the shell 118) and to resist deflection of the tube 116. The shoulder 119 also prevents the tube 116 from bottoming out across the air pocket 120 if the tube 116 is shifted or displaced during normal operation. The tube 116 adjoining the shoulder 119, the shoulder 119, and the shell 118 are sized to transfer the mechanical load from the tube through the shoulder 119 and shell 118 to the flange 114 without mechanical failure of the tube 116, flange 114, or shoulder 119 and to resist deflection of the tube 116, thereby preventing the tube 116 from bottoming out across the air pocket 120.

FIG. 3A shows a fitting 110 including an adapter 126 that extends away from the mounting flange 114 and away from the thermal shell 118. This adapter 126 is useful in attaching the fitting 110 to the bulkhead 108 with a jamb nut 132 that may be threaded onto threads 130, as shown in FIG. 4A.

FIG. 3B shows a fitting 110' according to an alternative embodiment. In this view, the adapter 126 is omitted and mounting studs 136 are provided on flange 114' as an alternative method of attaching the fitting 110' to the bulkhead 108, as shown and described below with reference to FIG. 4B.

Figure 4A:
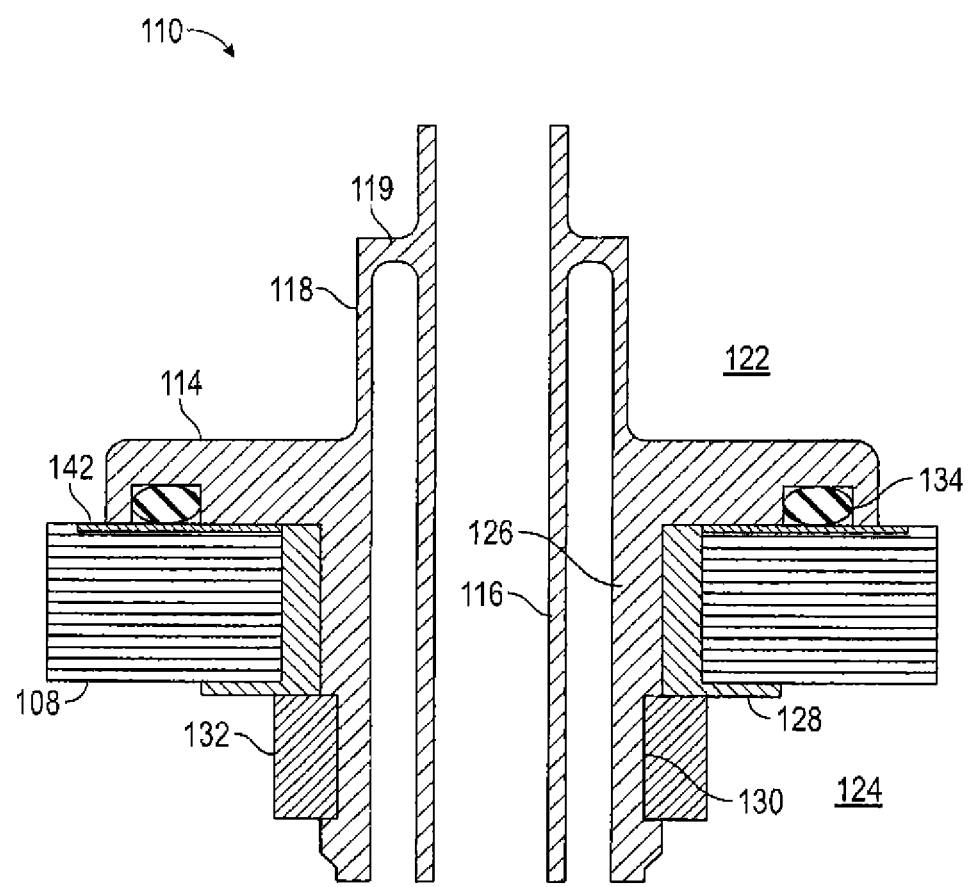
FIG. 4A is a side cutaway view of the fitting assembly.

FIGS. 4A and B show various methods of mounting the fittings 110, 110' to the bulkhead 108. The bulkhead 108 separates a wet side 122 (for example, the inside of a fuel tank) from a dry side 124 (for example an air pocket or outside of a fuel tank). According to the embodiments shown, the mounting flanges 114, 114' are placed on the wet side 122 of the bulkhead 108 and the tube 116 extends through an opening in the bulkhead 108. However, those skilled in the art will appreciate that the fitting may be reversed without departing from the scope of the disclosure.

As shown in FIG. 4A, the fitting 110 may include an adapter 126 that enables a mounting provision (jam nut 132 in this figure) extending through the bulkhead 108. A bushing 128 may be inserted between the adapter 126 and bulkhead 108. As shown, the adapter 126 preferably includes a threaded portion 130 on the part that extends beyond the bulkhead 108. This threaded portion 130 is adapted to receive the jamb nut 132 that locks the fitting in place.

Further included in the assembly illustrated in FIG. 4A may be an O-ring 134 that provides additional sealing between the mounting flange 114 and the bulkhead 108. This O-ring 134 functions in a manner that is well known in the art to provide sealing against fluid passing through any gaps between the mounting flange 114 and bulkhead 108.

The assembly illustrated in FIG. 4A therefore is held in place by sandwiching the bulkhead 108 between the mounting flange 114 of the fitting 110 and the jamb nut 132. The pressure provided by this joint deforms the O-ring 134, thereby compressing it into place and preventing fluid from leaking past the bulkhead 108. After assembly a fillet seal may be applied peripherally around the mounting flange 114 to prevent fuel from leaking past the bulkhead 108.

Figure 4B:
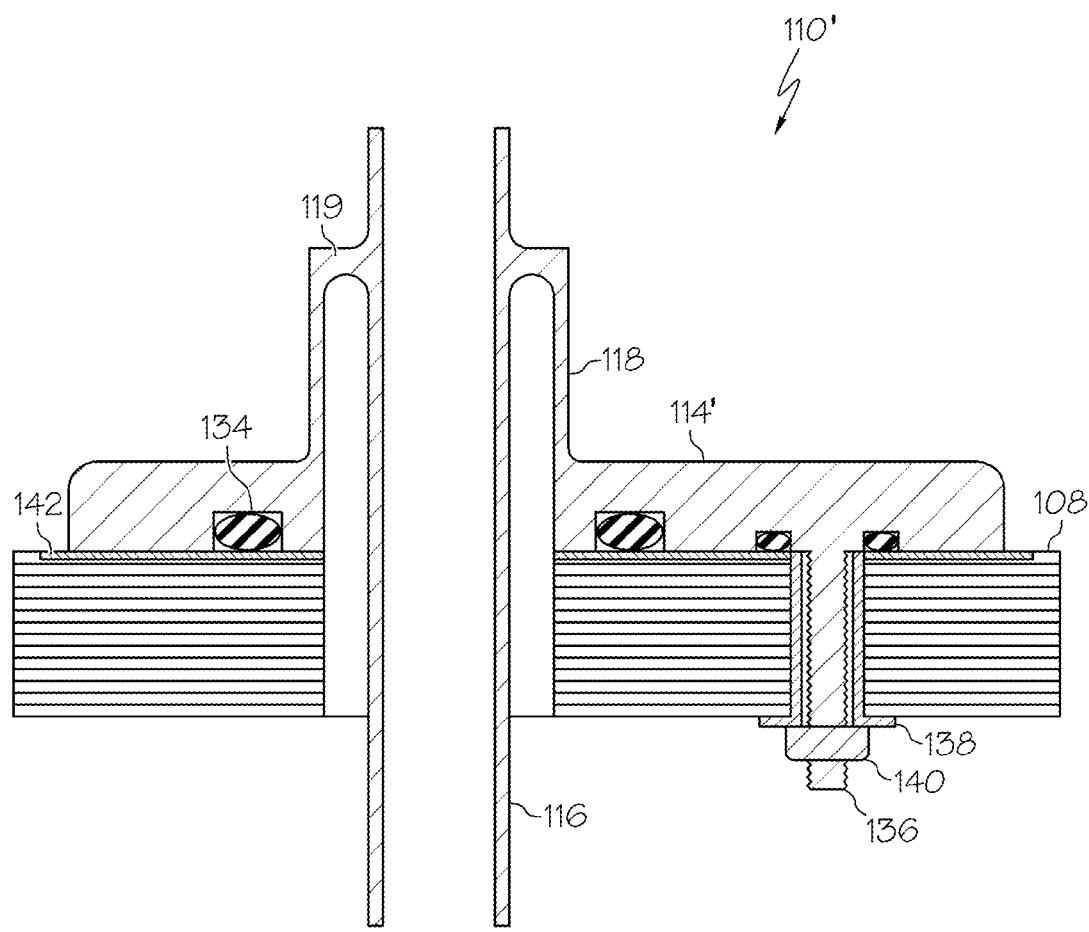
FIG. 4B is a side cutaway view of another fitting assembly.

An alternative assembly method is illustrated in FIG. 4B. As shown in this figure, a number of mounting studs 136 may extend away from the mounting flange 114' opposite the thermal shell 118. These mounting studs 136 preferably include threaded portions on the parts that extend beyond the bulkhead 108. These threaded portions are adapted to receive nuts that lock the fitting in place. As shown in the alternative assembly of FIG. 4B the nut 140 interacts with the mounting stud 136 to secure the fitting 110 to the bulkhead 108. As with the assembly shown in FIG. 4A, the plurality of mounting studs 136 and nuts 140 sandwich the fitting to the bulkhead 108. Bushings 138 may be inserted between the mounting studs 136 and bulkhead 108. These bushings protect the openings in the bulkhead from the mounting studs 136 during installation and repair. Further similar to the assembly shown in FIG. 4A, the assembly shown in FIG. 4B may include an O-ring 134 about the perimeter of the mounting flange 114' in a single piece or about the perimeter of the openings in the bulkhead for the tube and each mounting stud in separate individual pieces. After assembly a fillet seal may be applied peripherally around the mounting flange 114' to prevent fuel from leaking past the bulkhead 108.

The improved fittings 110, 110' illustrated in these figures accomplishes the objectives of providing a bulkhead 108 seal with a single piece welded metal part that is generally impermeable to fluid transfer from a wet side 122 to a dry side 124 of the bulkhead 108. Further, the fittings 110, 110' reduce heat transfer from the tube 116 to the respective mounting flanges 114, 114', thereby reducing the potential to damage the bulkhead 108. The reduction in heat transfer is achieved by means of a thin metal shell that is strong enough to transfer the mechanical load from the tube to the mounting flange without structural failure. Finally, the fittings 110, 110' provide a peripherally continuous metal path for electrical conduction of current from the tube directly to the bulkhead 108, thereby shielding the interior of a tank from the electrical environment outside of the tank and eliminating the need for additional structure to pass current to the bulkhead 108.

When secured to the bulkhead, the bushings 128, 138 serve the function of providing an all-metal interface for an electrical connection through the bulkhead fitting between the bulkhead 108 and tube 112. The all-metal interface assists in providing lightning strike protection by creating a current path from tube through fitting to bushing and bulkhead 108 that resists sparking during the transfer of current. As either the jamb nut 132 or nuts 140 are in engagement with both the fittings 110,110' and bushings 128, 138 (respectively, as shown in FIGS. 4A and 4B), an all-metal spark resistant bond path to the fittings 110, 110' through the jam nut 132 and nuts 140, respectively, is provided.

An additional element that may be included is the provision of a thin-walled dielectric layer 142 that further isolates the bulkhead 108 from the mounting flanges 114, 114' of the fittings 110, 110', respectively. This thin-walled dielectric layer 142 between the mounting flanges 114, 114' and bulkhead 108 provides electrical insulating advantages to prevent possible sparking from the flanges 114, 114' to the bulkhead 108 inside the tank. The layer 142 encompasses the full mounting surface and extends a specified distance outside the perimeter of the mounting surface. The thin-walled dielectric layer 142 may be either integrated into the bulkhead or integrated into the fittings 110, 114'.

Finally, a fillet seal may be provided around the perimeter of the mounting flanges 114, 114' during assembly to provide a mechanical barrier against leakage of fluid through the impermeable bulkhead barrier. Sealant may also be applied around each nut 132, 140 and each bushing 128, 138. The fillet seal may also provide a barrier against sparks that may develop in the interface between the fittings' 110, 110' and respective bushing 128, 138, and bulkhead 108.

The combination of all metal connection from tube to bushing, o-ring seal and fillet seal provided in the installation of the bulkhead fitting may be used to ensure satisfaction of FAR 25.981 by providing at least three independent features for the prevention of spark propagation within the fuel tank. Therefore, all of the objectives of the disclosure have been satisfied.

Figure 5A:
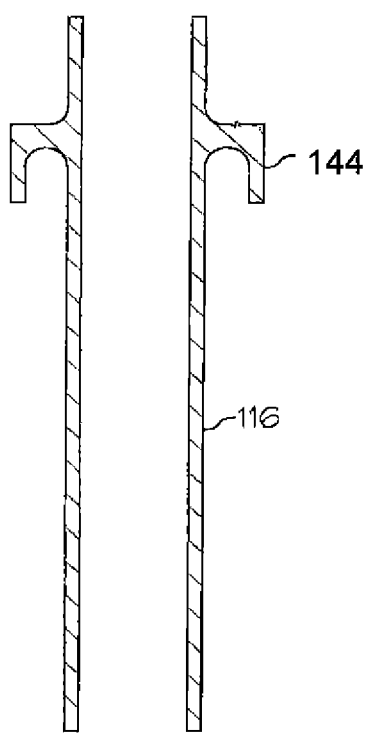
FIG. 5A is a side cutaway view of one component of the fitting.

A novel method of constructing the hydraulic bulkhead fitting 110 is disclosed for a continuous metal part. As shown in FIG. 5A, a tube 116 is provided having a perimeter shoulder 144 extending radially outward from the tube 116. This perimeter shoulder 144 may form the first part of the thermal shell 118.

Figure 5B:
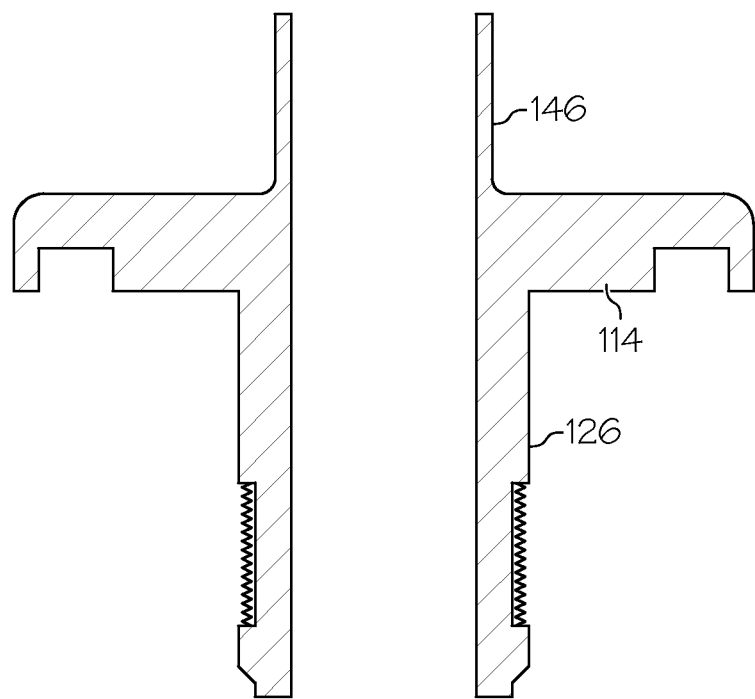
FIG. 5B is a side cutaway view of a second component of the fitting.

As shown in FIG. 5B, a mounting flange 114 is provided having a cylindrical shell 146 extending axially away from the mounting flange 114. This cylindrical shell 146 is preferably thin and may form the second part of the thermal shell 118.

Figure 5C:
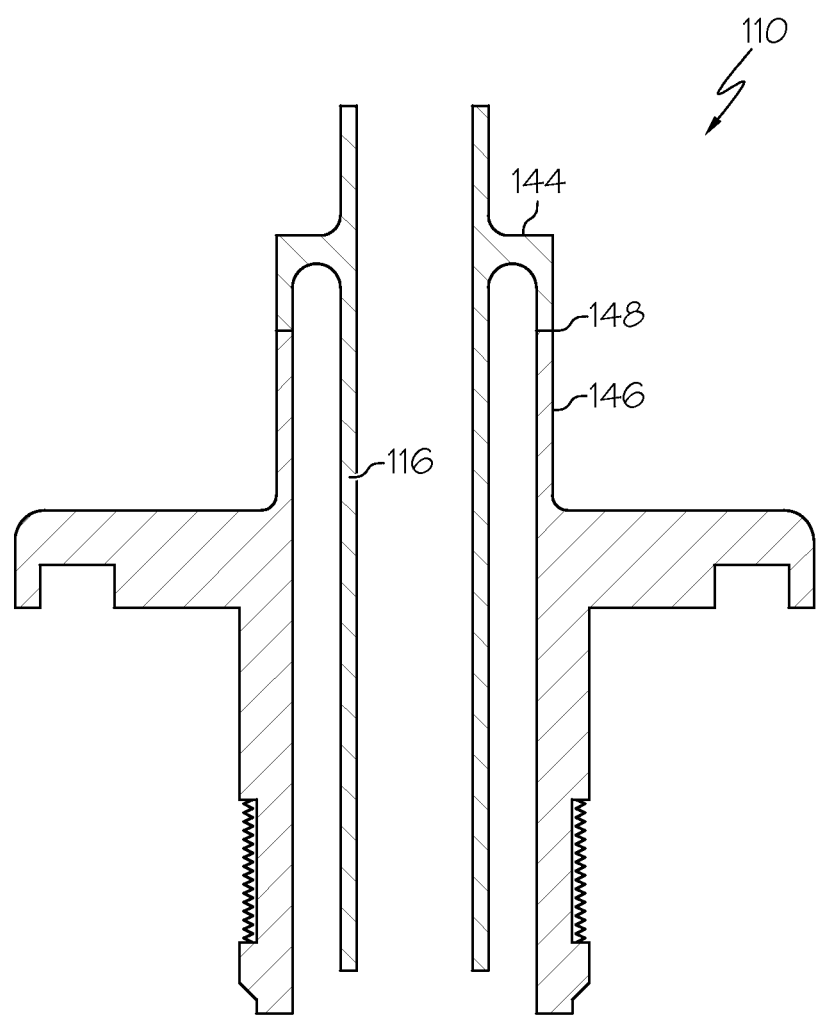
FIG. 5C is a side cutaway view of the assembled fitting of FIGS. 5A and 5B.

As shown in FIG. 5C, the mounting flange 114 and tube 116 are joined by a perimeter weld 148 between the perimeter shoulder 144 of the tube 116 and the cylindrical shell 146 of the mounting flange 114. This perimeter weld 148 joins the components together, thereby providing a complete thermal shell 118 and maintaining an air gap 120 (see FIG. 4A) between the thermal shell 118 and tube 116, with a continuous metal peripheral barrier from tube 116 to bulkhead 108 for leakage prevention and electrical shielding.

While the application has been described in detail, it should be apparent to those having skill in the art that a number of obvious variations may result without departing from the scope of the disclosure. Any descriptions are used as examples and not intended to be limiting of the scope of the disclosure. Detailed dimensions are the result of analysis that includes maximum hydraulic temperature and structural temperature limitations, and other performance conditions. Any limitations will appear in the claims as allowed.

What is claimed is:

1. A bulkhead fitting assembly comprising:
   a tube;
   a mounting flange attachable to a bulkhead;
   a thermal shell joining said mounting flange and said tube, said thermal shell having a portion spaced away from said tube and forming an air pocket between said tube and said thermal shell adjacent said mounting flange;
   an adapter extending away from said mounting flange and from said thermal shell;
   a bushing positioned between said adapter and said bulkhead, said bushing shaped to complete a current path from said tube to said adapter, from said adapter to said bushing, and from said bushing to said bulkhead; and
   a jam nut received on said adapter to lock said fitting assembly in place by sandwiching said bulkhead between said mounting flange and said jam nut, wherein said jam nut is in engagement with said bushing.

2. The bulkhead fitting assembly of claim 1, wherein said thermal shell includes a shoulder connecting said tube to a remainder of said thermal shell, said shoulder is substantially perpendicular to said tube, and said adapter is oriented substantially perpendicular to said mounting flange and parallel to said tube.

3. The bulkhead fitting assembly of claim 1, wherein said jamb nut is threaded onto threads of a threaded portion of said adapter that extends beyond said bulkhead.

4. The bulkhead fitting assembly of claim 1, further comprising an O-ring received by said mounting flange and positioned to engage said bulkhead, thereby preventing fluid from leaking past said bulkhead.

5. The bulkhead fitting assembly of claim 1, further comprising a dielectric layer positioned between said mounting flange and said bulkhead, and configured such that sparking from said flange to said bulkhead is prevented.

6. The bulkhead fitting assembly of claim 1, wherein said bulkhead fitting is made of a titanium alloy material.

7. A bulkhead fitting assembly comprising:
   a tube;
   a mounting flange attachable to a bulkhead;
   an adapter having a thermal shell joining said mounting flange and said tube, said thermal shell having a portion spaced away from said tube and forming an air pocket between said tube and said thermal shell adjacent said mounting flange;

an O-ring received by said mounting flange and positioned to engage said bulkhead, thereby preventing fluid from leaking past said bulkhead; and a bushing positioned between said adapter and said bulkhead, said bushing shaped to complete a current path from said tube to said adapter, from said adapter to said bushing, and from said bushing to said bulkhead.

8. A bulkhead fitting assembly comprising:

a tube;

a mounting flange attachable to a bulkhead;

an adapter having a thermal shell joining said mounting flange and said tube, said thermal shell having a portion spaced away from said tube and forming an air pocket between said tube and said thermal shell adjacent said mounting flange;

a bushing positioned between said adapter and said bulkhead, said bushing shaped to complete a current path from said tube to said adapter, from said adapter to said bushing, and from said bushing to said bulkhead; and said bulkhead fitting assembly made of a titanium alloy material.

\* \* \* \* \*